United States Patent
Kasuya

(10) Patent No.: US 12,010,281 B2
(45) Date of Patent: Jun. 11, 2024

(54) IMAGE PROCESSING APPARATUS, METHOD OF CONTROLLING IMAGE PROCESSING APPARATUS, AND STORAGE MEDIUM TO DETERMINE WHETHER IMAGE PROCESSING ON IMAGE DATA IS TO BE EXECUTED IN PARALLEL WITH OTHER IMAGE PROCESSING DIFFERENT FROM THE IMAGE PROCESSING

(71) Applicant: CANON KABUSHIKI KAISHA, Tokyo (JP)

(72) Inventor: Kenji Kasuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/329,962

(22) Filed: May 25, 2021

(65) Prior Publication Data
US 2021/0385349 A1  Dec. 9, 2021

(30) Foreign Application Priority Data
Jun. 5, 2020 (JP) ................. 2020-098731

(51) Int. Cl.
*H04N 1/387*    (2006.01)
*H04N 1/00*     (2006.01)
(Continued)

(52) U.S. Cl.
CPC ....... *H04N 1/0446* (2013.01); *H04N 1/00822* (2013.01); *H04N 1/0083* (2013.01); *H04N 1/0096* (2013.01); *H04N 1/17* (2013.01)

(58) Field of Classification Search
CPC .......... H04N 1/00411; H04N 1/00427; H04N 1/00482; H04N 1/00652; H04N 1/32448;
(Continued)

(56) References Cited

U.S. PATENT DOCUMENTS

| 5,668,938 A * | 9/1997 | Tomory ................. G06K 15/00 |
| | | 358/1.15 |
| 2016/0170692 A1* | 6/2016 | Osada ................. H04N 1/00204 |
| | | 358/1.15 |

(Continued)

FOREIGN PATENT DOCUMENTS

| JP | 2013153521 A | 8/2013 |
| JP | 2014209711 A | 11/2014 |

(Continued)

*Primary Examiner* — Chad Dickerson
(74) *Attorney, Agent, or Firm* — Canon U.S.A., Inc. IP Division

(57) ABSTRACT

In a case where it is determined that image processing on image data is executed not in parallel with other image processing different from the image processing and printing of an image of the document is started after reading of an image of a first page of the document is completed, a transfer rate of image data from an image reading unit to an image processing unit is set to a predetermined transfer rate. Whereas in a case where it is determined that the image processing on image data is executed not in parallel with the other image processing different from the image processing and printing of the image of the document is started without waiting for the reading of the image of the first page of the document to be completed, the transfer rate is set to a transfer rate lower than the predetermined transfer rate.

8 Claims, 12 Drawing Sheets

(51) Int. Cl.
*H04N 1/04* (2006.01)
*H04N 1/17* (2006.01)

(58) Field of Classification Search
CPC ........... H04N 1/32673; H04N 1/00811; H04N 1/00822; H04N 1/0096; H04N 1/0443; H04N 1/0446; H04N 1/17; H04N 1/2338; H04N 1/2369; H04N 2201/0094; H04N 2201/0454
USPC .................. 358/1.11–1.18, 400–404, 474
See application file for complete search history.

(56) References Cited

U.S. PATENT DOCUMENTS

| | | | |
|---|---|---|---|
| 2020/0021703 A1* | 1/2020 | Kasuya | H04N 1/32448 |
| 2020/0021706 A1* | 1/2020 | Shinohara | H04N 1/00933 |
| 2020/0137261 A1* | 4/2020 | Hirao | H04N 1/32683 |

FOREIGN PATENT DOCUMENTS

| | | |
|---|---|---|
| JP | 2017046291 A | 3/2017 |
| JP | 2020010252 A | 1/2020 |

* cited by examiner

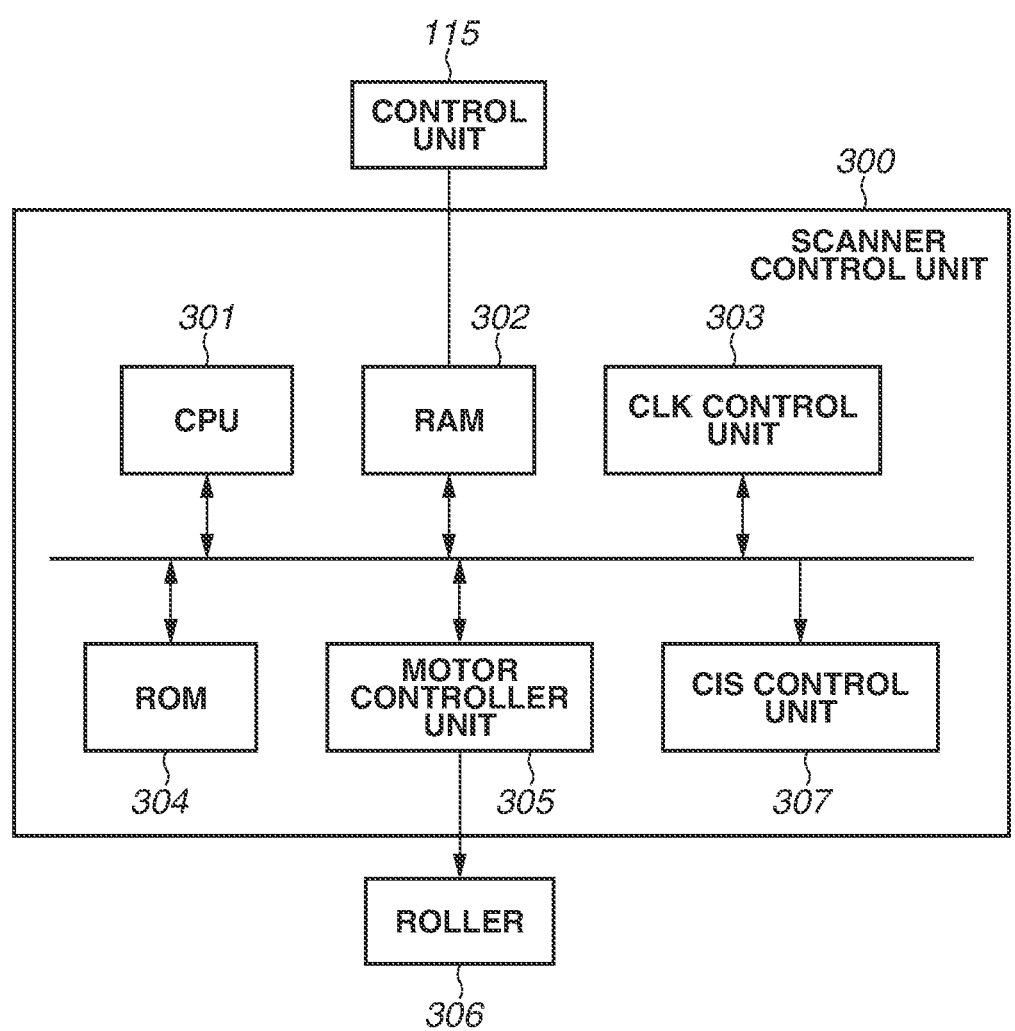

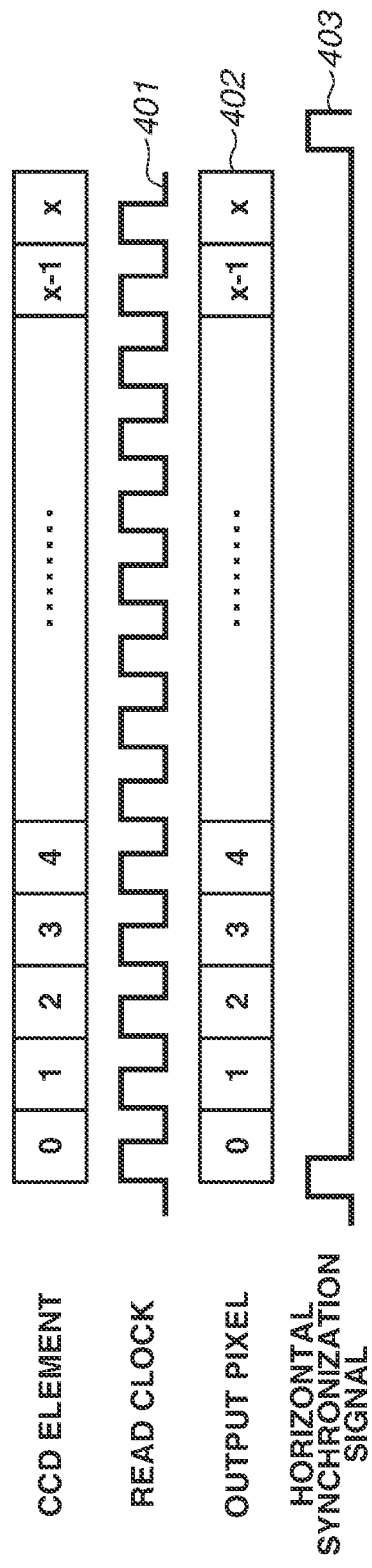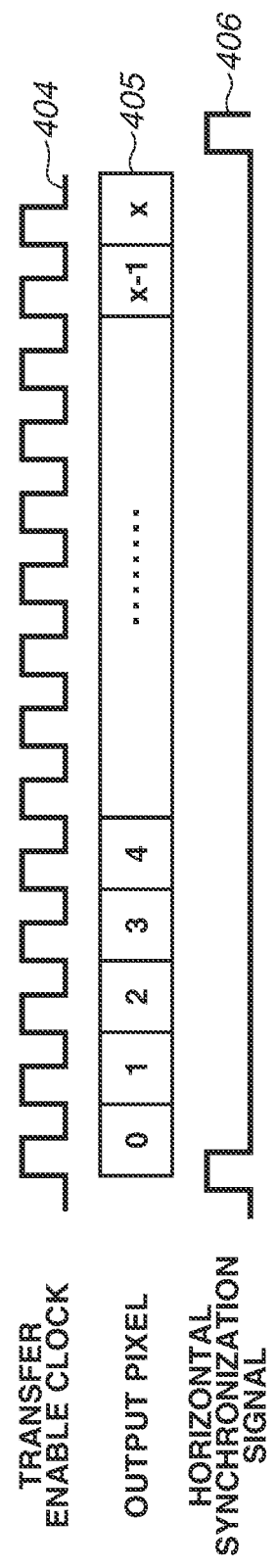

FIG.11

COPY FCOT MODE OPERATION CONDITION

| SETTING ITEM | SETTING VALUE |
|---|---|
| COLOR MODE | MONOCHROME/FULL-COLOR *NOT AUTO |
| SHEET FEEDING CASSETTE | ANY *NOT AUTO |
| DOCUMENT SIZE | A4/LTR |
| CONTINUOUS READING | OFF |
| TWO-SIDED SETTING | OFF (ONE-SIDED READING → ONE-SIDED PRINTING) |
| COPY RATIO | DIRECT (100%) |
| N ON 1 | OFF |
| ERASE FRAME | OFF |
| DOCUMENT TYPE | TEXT/IMAGE/MAP (SPEED PRIORITY) |
| DOCUMENT SIZE MIXED | OFF |
| AUTO-ROTATION | OFF |
| SORTING | OFF |
| CONTINUOUS COPY OF PAGES | OFF |
| NUMBER OF COPIES | 1 |

FIG.12A

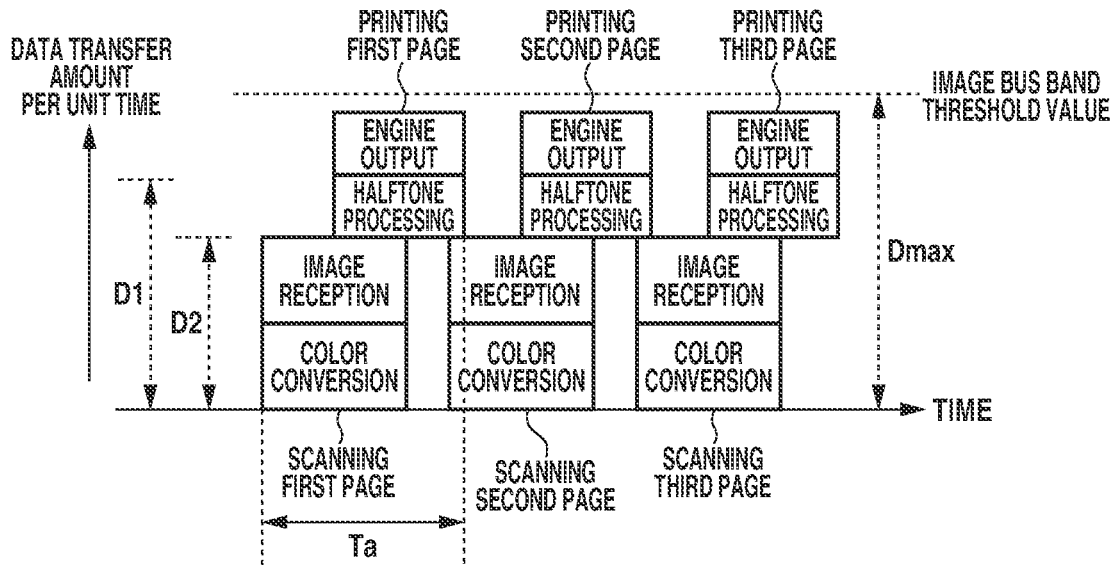

FIG.12B

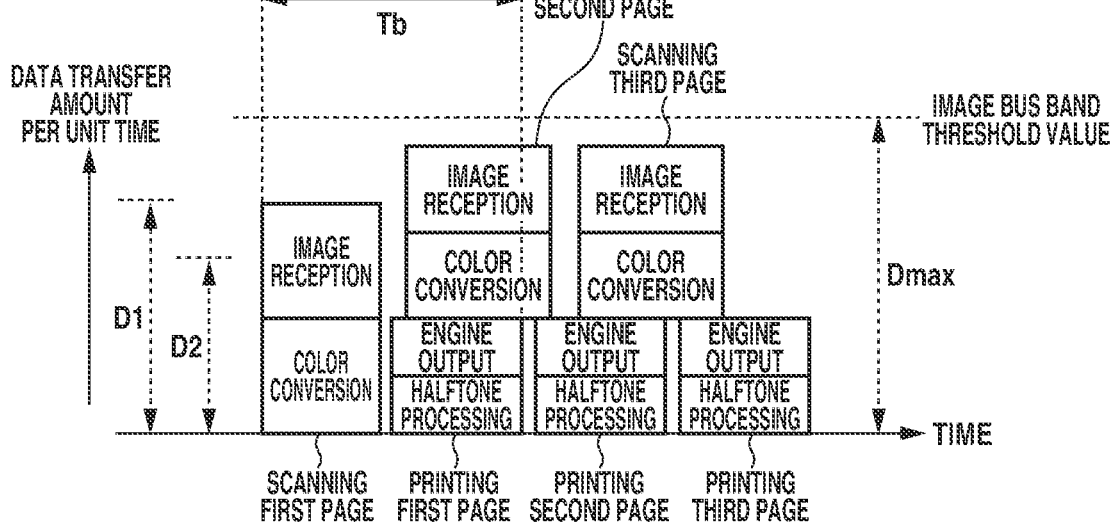

D1: SCAN DATA TRANSFER AMOUNT PER UNIT TIME IN SINGLE IMAGE TRANSFER MODE
D2: SCAN DATA TRANSFER AMOUNT PER UNIT TIME IN PARALLEL IMAGE TRANSFER MODE
Dmax: DATA BUS BAND THRESHOLD VALUE Ta: FCOT TIME IN CASE WHERE FIRST PAGE IS SCANNED IN PARALLEL IMAGE TRANSFER MODE
Tb: FCOT TIME IN CASE WHERE FIRST PAGE IS SCANNED IN SINGLE IMAGE TRANSFER MODE ΔT: DIFFERENCE BETWEEN Ta AND Tb

IMAGE PROCESSING APPARATUS, METHOD OF CONTROLLING IMAGE PROCESSING APPARATUS, AND STORAGE MEDIUM TO DETERMINE WHETHER IMAGE PROCESSING ON IMAGE DATA IS TO BE EXECUTED IN PARALLEL WITH OTHER IMAGE PROCESSING DIFFERENT FROM THE IMAGE PROCESSING

BACKGROUND

Field

The present disclosure relates to an image processing apparatus, a method of controlling an image processing apparatus, and a storage medium.

Description of the Related Art

A conventional technique in which a plurality of reading speeds is set to an image reading unit that reads a document image and generates image data, and the different reading speeds are used for various purposes of use is known (see Japanese Patent Application Laid-Open No. 2013-153521).

A control unit that receives the image data generated by the image reading unit and processes the received image data includes various image processing units. The image processing units exchange image data using shared memory and execute image processing. At this time, the image data is transmitted and received via the same data bus.

The amount of data the data bus of an image processing unit can process in a predetermined amount of time is limited. If various types of image processing are executed in parallel, the limit of the data bus may be exceeded, and data transfer processing may be delayed or stopped. In this case, the image processing unit cannot obtain the next image data from the image reading unit and cannot continue an image reading operation normally.

Methods for overcoming this issue have been discussed. Specifically, whether the image reading operation and another image processing operation are executed in parallel is determined, and in a case where the image reading operation and the other image processing operation are executed in parallel, a transfer rate of image data transfer from the image reading unit to the control unit is set lower than that in a case where the image reading operation is to be executed singly. This prevents a data amount from exceeding the limit of the amount of data the data bus of the image processing unit can process in the predetermined amount of time.

The conventional technique, however, does not take a first copy output time (FCOT) mode into consideration. The FCOT mode is a mode in which printing of an image of a document is started without waiting for reading of an image of a first page of the document to be completed. The FCOT mode reduces the time from the start of a copy job to the end of printing of the first page.

In a case where a copy job is executed when there is no other job, image reading is operated singly at the start of the copy job so that the transfer rate of image data transfer from the image reading unit to the control unit is set to a single operation mode (high-speed transfer mode), and image reading is started.

In the single operation mode, however, if printing of the image of the first page of the document is started without waiting for reading of the image on the first page of the document to be completed, the reading and printing of the document are executed in parallel, and the limit of the data bus of the image processing unit may be exceeded.

SUMMARY

An aspect of the present disclosure is an image processing apparatus comprising a reading unit configured to read a document and generate image data, an image processing unit configured to perform image processing, and a printing unit. The image processing apparatus further comprises a control unit configured to control a transfer rate for transferring the image data from the reading unit to the image processing unit, and a determination unit configured to determine whether the image processing on the image data is to be executed in parallel with other image processing different from the image processing. In a case where the determination unit determines that the image processing on the image data is not to be executed in parallel with the other image processing different from the image processing and the printing unit starts printing an image of the document after reading of an image of a first page of the document is completed, the control unit sets the transfer rate to a predetermined transfer rate. Whereas in a case where the determination unit determines that the image processing on the image data is not to be executed in parallel with the other image processing different from the image processing and the printing unit starts printing the image of the document without waiting for the reading of the image of the first page of the document to be completed, the control unit sets the transfer rate to a transfer rate lower than the predetermined transfer rate.

Further features and aspects of the present disclosure will become apparent from the following description of exemplary embodiments with reference to the attached drawings.

BRIEF DESCRIPTION OF THE DRAWINGS

FIG. 3 is a block diagram illustrating a scanner control unit according to an exemplary embodiment.

FIGS. 4A and 4B are clock timing charts of a scanner unit according to an exemplary embodiment.

FIG. 11 is a diagram illustrating first copy output time (FCOT) mode operation conditions according to an exemplary embodiment.

FIGS. 12A and 12B are timing charts of an operation in the copy FCOT mode according to an exemplary embodiment.

DESCRIPTION OF THE EMBODIMENTS

Various exemplary embodiments will be described in detail below with reference to the attached drawings. The exemplary embodiments described herein are not intended to limit the present disclosure set forth in the claims, and not all combinations of features described in the exemplary embodiments are always essential to a technical solution of the present disclosure.

Figure 1:
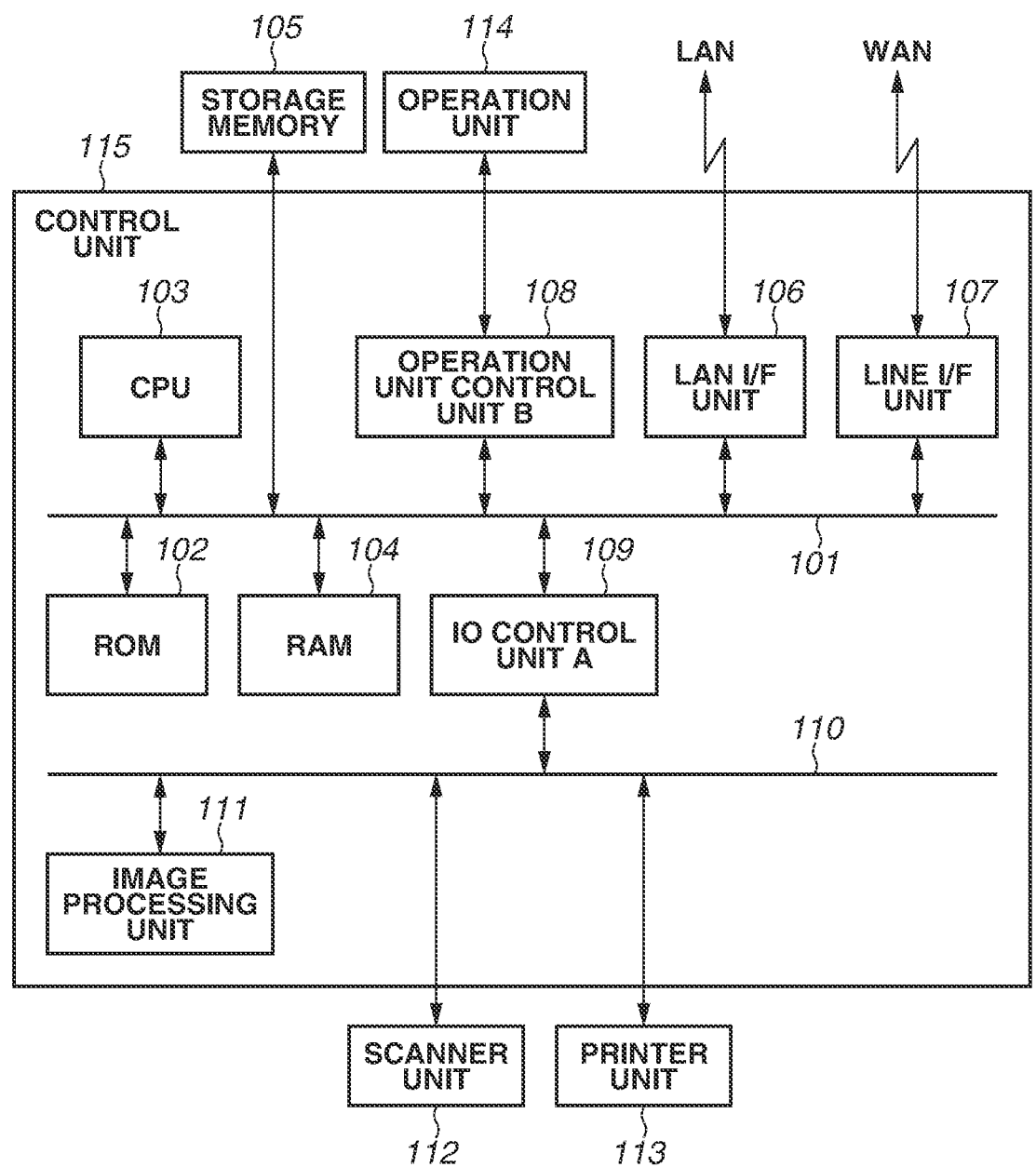
FIG. 1 is a system block diagram illustrating an image processing apparatus according to an exemplary embodiment.

FIG. 1 is a block diagram illustrating a configuration of a control unit 115 of an image processing apparatus according to a first exemplary embodiment. Each component of the control unit 115 is connected to a system bus 101 and an image bus 110.

A central processing unit (CPU) 103 integrally controls the image processing apparatus.

A read-only memory (ROM) 102 stores various programs for implementing each unit of the present disclosure, such as a system boot program.

A random access memory (RAM) 104 is a system work memory area for software execution by the CPU 103 and is an image memory for temporary storage during image data processing.

A storage memory 105 includes a hard disk drive (HDD) and/or a solid state drive (SSD) and is used as an internal storage. The storage memory 105 stores image data generated by a scanner unit 112 reading a document, various programs for implementing each unit of the present exemplary embodiment, and various types of system software.

A local area network (LAN) interface (I/F) unit 106 is an I/F unit for connecting to a LAN, and information is input to and output from each device connected to the LAN via the LAN I/F unit 106.

A line I/F unit 107 is an I/F unit for connecting to a wide area network (WAN), and information is input to and output from each device connected to the WAN via the line I/F unit 107.

An operation unit control unit B 108 for image data is an interface unit with an operation unit 114 (user interface (UI)) and outputs, to the operation unit 114, image data to be displayed on the operation unit 114. Further, the operation unit control unit B 108 plays the role of transmitting information input by a system user via the operation unit 114 to the CPU 103. The operation unit control unit B 108 is an I/F unit via which software controls the operation unit 114, which includes a display apparatus and a keypad apparatus. In the present exemplary embodiment, the operation unit 114 includes a liquid crystal display (LCD) touch panel and interprets a video graphics array (VGA) signal output from the operation unit control unit B 108 and displays the interpreted signal.

An input/output (IO) control unit A 109 is a bus bridge connected to the system bus 101 and the image bus 110 configured to transfer image data at high speed. The IO control unit A 109 converts a data structure for the system bus 101.

The foregoing devices are arranged on the system bus 101.

The image bus 110 includes a general-purpose bus such as a peripheral component interconnect (PCI) bus, an Institute of Electrical and Electronics Engineers (IEEE) 1394 bus, or a peripheral component interconnect-express (PCIEx) bus. The IO control unit A 109, the scanner unit 112 and a printer unit 113 that are image input and output devices, and an image processing unit 111 are connected on the image bus 110.

The image processing unit 111 includes a plurality of application-specific integrated circuits (ASICs) that performs image processing such as resolution conversion, compression and decompression, and binary/multi-value conversion on input image data. The term ASIC is a collective term for an application-specific integrated circuit.

Figure 2:
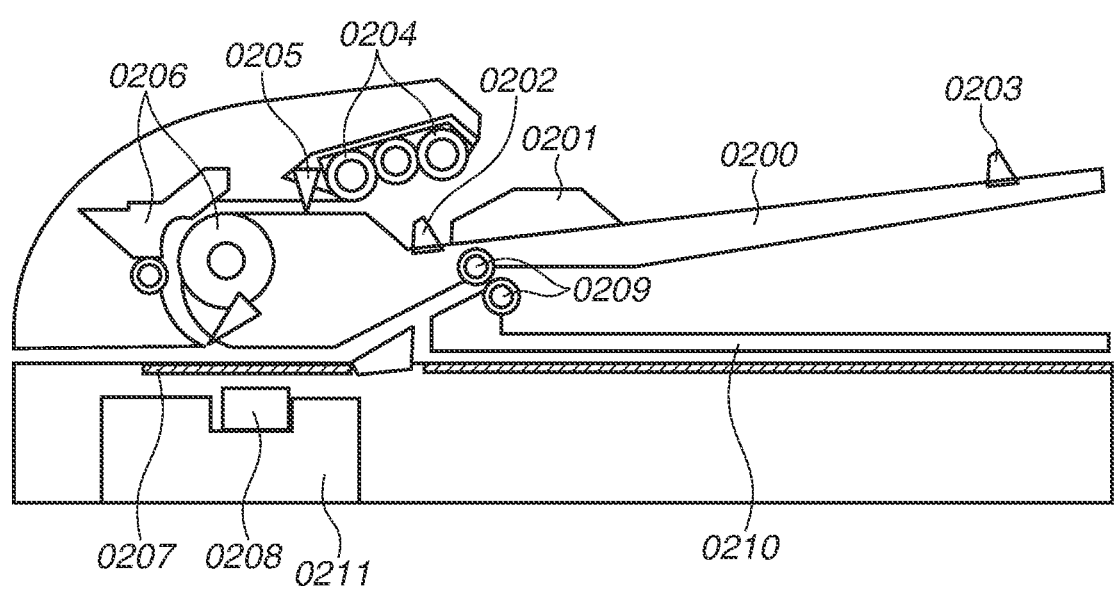
FIG. 2 is a cross-sectional view illustrating an automatic document feeder (ADF) according to an exemplary embodiment.

FIG. 2 is a side cross-sectional view illustrating an internal configuration of the scanner unit 112 including a document feeder (DF) unit.

The DF unit includes a document tray 0200, and a document to be read is placed on the document tray 0200. A document sensor 0202, two document guides 0201, and a document size detection sensor 0203 are provided on the document tray 0200. The document sensor 0202 detects whether there is a document on the document tray 0200.

The two document guides 0201 are arranged next to each other in a document-lengthwise direction (in a direction perpendicular to a document conveyance direction). A document placed on the document tray 0200 is conveyed by three rollers that are a pickup roller 0204, a conveyance roller 0206, and a sheet discharge roller 0209.

The pickup roller 0204 is a roller that conveys the document placed on the document tray 0200 into a document conveyance path in the DF unit.

The conveyance roller 0206 conveys the document conveyed into the document conveyance path by the pickup roller 0204, and the sheet discharge roller 0209 conveys the document conveyed by the conveyance roller 0206 to a sheet discharge tray 0210.

Further, the document conveyed by the pickup roller 0204 is detected by a document passing detection sensor 0205, and whether a first page of the document has passed is determined based on the detection time. Although not illustrated, the conveyance roller 0206, the pickup roller 0204, and the sheet discharge roller 0209 are each driven by a stepping motor.

Sub-scan thinning processing of the DF unit is implemented by setting a driving pulse of each of the conveyance roller 0206, the pickup roller 0204, and the sheet discharge roller 0209 to a double frequency.

The document conveyed by the DF unit is read by a contact image sensor (CIS) 0208 of a sensor unit 0211 through a DF reading window 0207.

The sensor unit 0211 is freely movable in a sub-scanning direction and is also movable in the same direction as the document conveyance direction in which the document is conveyed from the conveyance roller 0206 to the sheet discharge roller 0209. The DF reading window 0207 has a certain length in the sub-scanning direction, and the CIS 0208 can be moved to any position within the length range and can read the document at the position where the CIS 0208 is moved.

The CIS 0208 includes photoelectric conversion elements such as charge-coupled device (CCD) elements. The CIS 0208 performs a first-in first-out (FIFO) operation for storing images of the elements simultaneously with generating control signals for controlling the FIFO operation and the CCD elements. In general, the CIS 0208 is implemented by the plurality of photoelectric conversion elements arranged in one line.

FIG. 3 is a diagram illustrating details of the scanner unit 112.

A scanner control unit 300 is a block in which hardware components for controlling the scanner unit 112 by a scanner unit control application program are combined together. The block is included in the scanner unit 112.

The scanner unit 112 is controlled by the scanner unit control application program executed by a CPU 301 of the scanner control unit 300. The CPU 301 of the scanner unit 112 can control the scanner unit 112 by executing the application program for controlling the scanner unit 112 based on an instruction from the CPU 103 of the control unit 115, which is the same as that illustrated in FIG. 1.

The scanner control unit 300 includes the CPU 301, a RAM 302, a clock (CLK) control unit 303, a ROM 304, a motor controller unit 305, and a CIS control unit 307. The CPU 301 controls a scan operation of the scanner unit 112. The ROM 304 is a memory that stores a program read by the CPU 301. The CPU 301 controls the scan operation of the scanner unit 112 by executing the program stored in the ROM 304.

The scanner unit control application program is stored in the ROM 304 and is executed by the CPU 301.

The CLK control unit 303 distributes a clock to each block. The CLK control unit 303 includes a crystal oscillator and a phase locked loop (PLL) element. The crystal oscillator generates a clock, and the PLL element multiplies and divides the clock generated by the crystal oscillator.

The scanner unit control application program that controls the scanner control unit 300 outputs a control clock from the CLK control unit 303 to the motor controller unit 305, the CIS control unit 307, and the RAM 302 based on an instruction for scanning.

Each block further multiplies and divides the clock input from the CLK control unit 303 and generates a control clock for operating the motors that rotate the CIS 0208 and the various rollers 0204, 0206, and 0209.

The instruction for scanning contains information about color/monochrome distinction and resolution, and the scanner unit control application program changes PLL settings of the CLK control unit 303 based on the content of the instruction. By changing the PLL settings, frequencies of various clocks are changed so that the reading speed is changed.

The RAM 302 temporarily stores image data read by the CIS 0208. The image data stored in the RAM 302 is thereafter transferred to the control unit 115.

In the present exemplary embodiment, the RAM 302 has enough capacity to store image data of a document of four pages in A4 size.

The motor controller unit 305 controls driving of the various rollers 0204, 0206, and 0209 illustrated in FIG. 2.

The CIS control unit 307 controls operations of the CIS 0208.

In signal reading by the CIS 0208, an amount of data to be read is controlled using a read clock for reading an image from each pixel and a transfer enable clock for transferring or not transferring the read pixel to the control unit 115.

FIGS. 4A and 4B schematically illustrate the concept. For simplification, only an operation of inputting all data without reducing the number of pixels and an operation of inputting data in a case where the number of pixels is reduced by half will be described below, but this is not intended to limit the present exemplary embodiment to the operation in the case of reducing the number of pixels by half.

Data reading of each photoelectric conversion element is controlled using a read clock 401. At the rise of the read clock 401, data on each element is read by the CIS 0208. With respect to the read data, data 402 from each pixel is captured by the CIS 0208 based on the FIFO method. The data captured based on the FIFO method is stored in the RAM 302 as needed. A transfer enable clock 404 is input to the image data stored in the RAM 302 by control using a horizontal synchronization signal 406, and data 405 on each pixel is transferred to the control unit 115 in synchronization with the rise of the transfer enable clock 404.

A horizontal synchronization signal 403 is a clock signal for controlling the start of the capture of one line of the CCD elements, and a pulse width modulation (PWM) signal for driving each pickup roller 0204 on the scanner unit 112 is generated in synchronization with the horizontal synchronization signal 403. Specifically, as a period of the horizontal synchronization signal 403 becomes shorter, a rotation rate of the pickup roller 0204 becomes relatively high, and the document conveyance becomes faster, so that the reading speed per document increases. In a case where the number of pixels X of the CCD elements is the same, to shorten the period of the horizontal synchronization signal 403, reading from the CCD elements needs to be performed in a short period of time, so that a period of the read clock 401 becomes shorter. As the period of the read clock 401 becomes shorter, the data storage in the RAM 302 becomes faster, and data output from the RAM 302 needs to be performed in a short period of time in synchronization with the data storage.

Consequently, the amount of data transfer from the scanner unit 112 to the RAM 104 or the image processing unit 111 via the image bus 110 per unit time increases. As the amount of data transfer per unit time increases, the limit of the data bus may be exceeded, and data transfer processing may be delayed or stopped. In a case where the data transfer processing is delayed, the data transfer for the operation of a print job in the printer unit 113 is delayed, and an image may not be printed correctly. Furthermore, in a case where the data transfer processing is stopped, the next image data is not captured from the image reading unit, and the image reading operation may not be continued normally.

Figure 5:
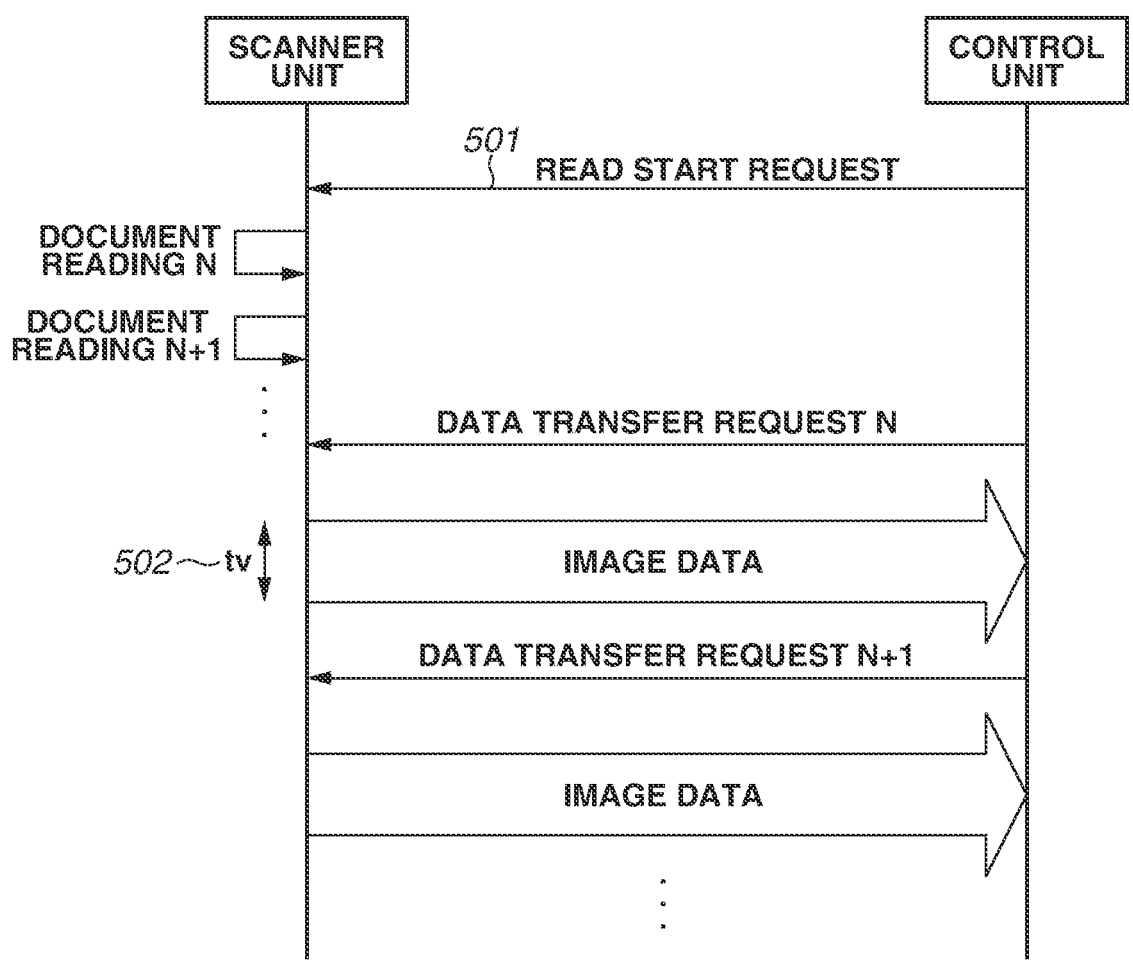
FIG. 5 is a reading control sequence diagram according to an exemplary embodiment.

FIG. 5 is a sequence diagram illustrating a reading operation. The sequence is executed by the scanner unit control application program that controls the scanner unit 112 and a job control application that controls the control unit 115.

The applications are both stored in a non-volatile area such as the ROM 102 or the storage memory 105, and after an image forming apparatus is turned on, the applications are loaded into the RAM 104 and executed by the CPU 103.

The scanner unit 112 having received a read start request 501 from the control unit 115 outputs various control clocks and reads a document. In a case where the transfer enable clock 404 becomes high speed, an image transfer time (tv 502) on the sequence diagram becomes shorter, and the reading speed increases.

Since the capacity of the RAM 302 is limited, each time the scanner unit 112 reads one page of a document, the scanner unit 112 transfers one image to the control unit 115. Thus, the read clock 401 and the transfer enable clock 404 coincide. Alternatively, the document reading can be continued without synchronization with the image data transfer to the control unit 115 while the RAM 302 of the reading unit can store image data as in the sequence diagram in FIG. 5.

Figure 6:
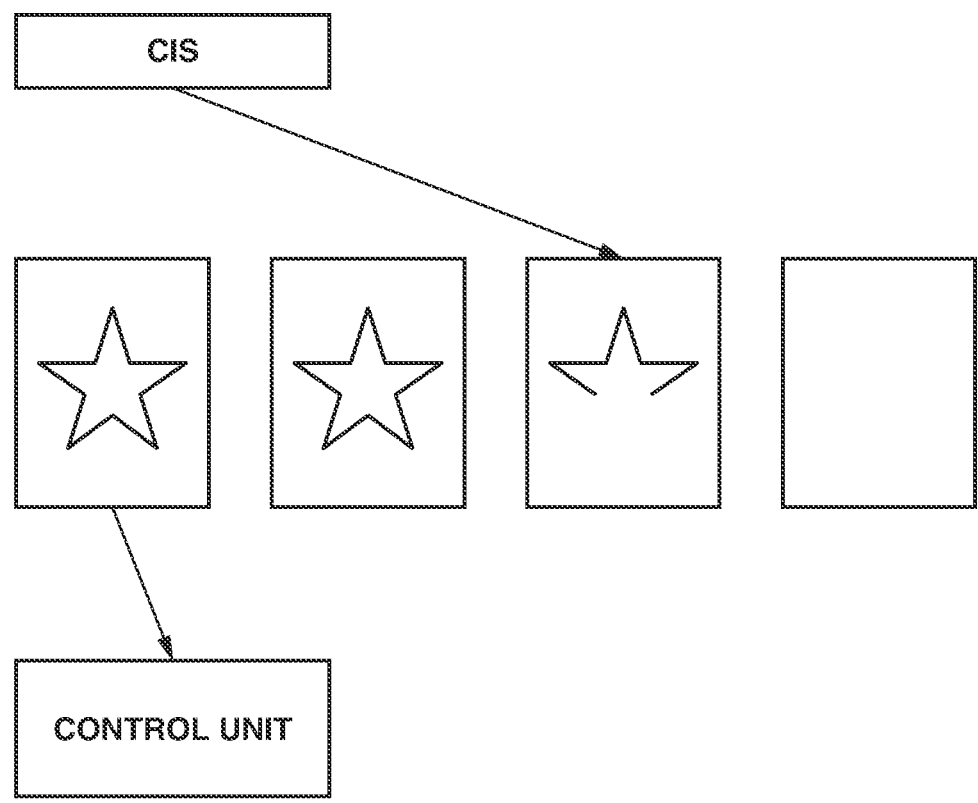
FIG. 6 is a conceptual diagram illustrating a random access memory (RAM) of a scanner unit according to an exemplary embodiment.

FIG. 6 is a diagram illustrating how image data is stored in the RAM 302 of the scanner unit 112. As described above with reference to the sequence in FIG. 5, while the RAM 302 has a free space, the scanner unit 112 continues reading and stores image data in the RAM 302. The stored image data is output to the control unit 115 in synchronization with the transfer enable clock 404, and after the data of one page of a document is output, the corresponding area is used in the next document reading.

Figure 7:
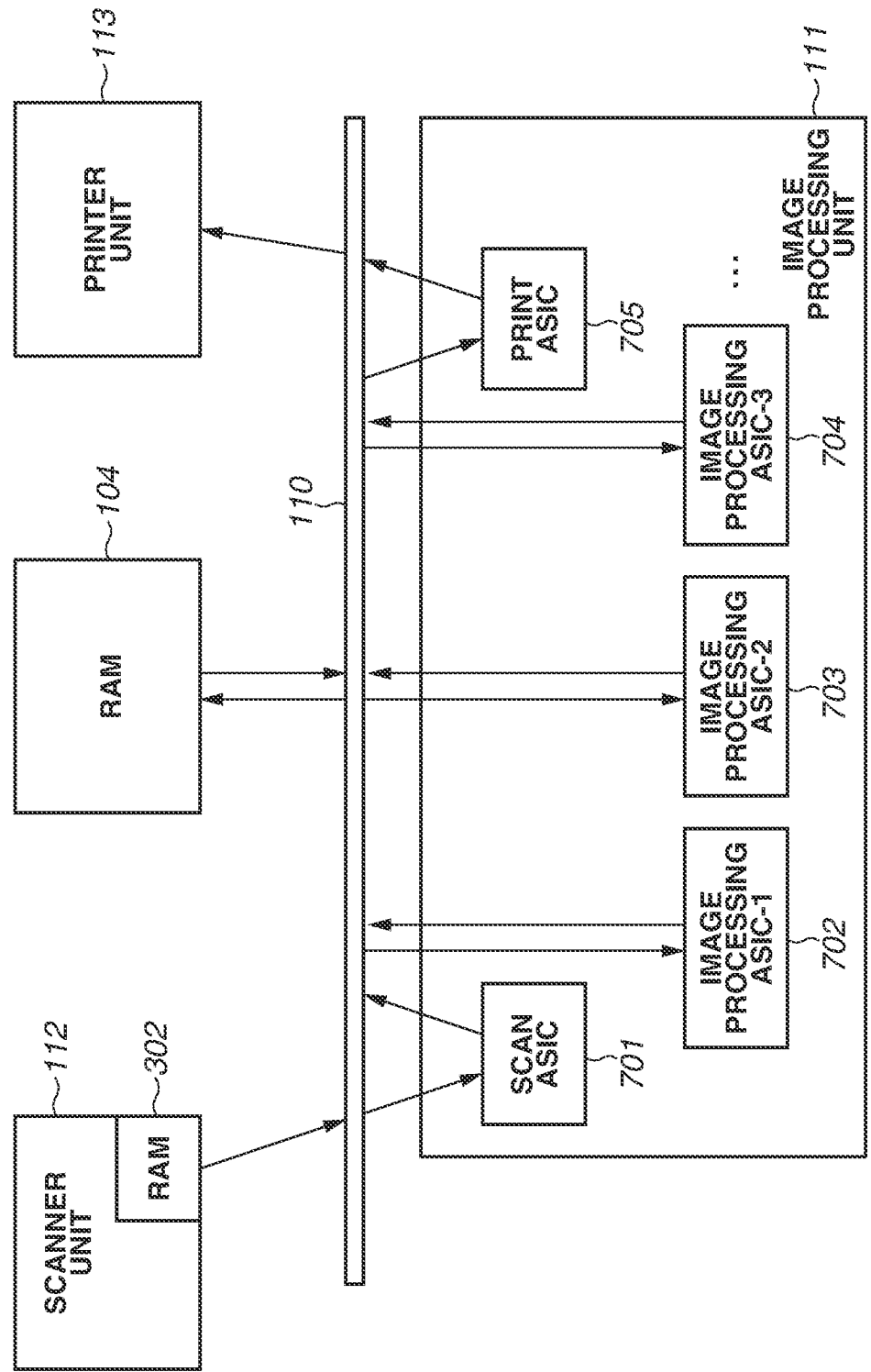
FIG. 7 is a block diagram illustrating an image processing unit according to an exemplary embodiment.

Next, the image data transfer between the scanner unit 112 and the image processing unit 111, the RAM 104, and the printer unit 113 will be described in more detail below with reference to FIG. 7. FIG. 7 schematically illustrates the image data transfer between the scanner unit 112 and the image processing unit 111, the RAM 104, and the printer unit 113. While the RAM 104 is not directly connected to the image bus 110 as illustrated in FIG. 1, the configuration is illustrated simply in FIG. 7.

The image processing unit 111 includes a plurality of ASICs 701, 702, 703, 704, and 705 configured to perform image processing such as resolution conversion, compression and decompression, and binary/multi-value conversion on image data. The ASICs 701, 702, 703, 704, and 705 perform image data input and image data output with respect to the shared RAM 104 via the image bus 110.

Since the shared image bus 110 is used, in a case where various types of image processing are executed in parallel and a plurality of pieces of image data is simultaneously transferred on the image bus 110, the limit of the data bus may be exceeded, and the processing may be delayed or stopped. Furthermore, in a case where the scanner unit 112 reads a document at high speed and the transfer enable clock 404 consequently operates at high speed, a large amount of data is momentarily transferred from the scanner unit 112 to the image bus 110.

Next, a procedure for controlling a copy job in the image processing apparatus according to the present exemplary embodiment will be described with referenced to FIG. 8. The CPU 103 reads a program stored in the ROM 102 or the storage memory 105 and executes the read program to thereby implement the steps in the flowchart illustrated in FIG. 8.

First, in step S801, the CPU 103 receives copy job settings and an instruction to start a copy job to be executed from a user via the operation unit 114. The copy job is a job of generating image data by reading a document by the scanner unit 112, performing image processing on the image data by the image processing unit 111, and printing the image-processed image data by the printer unit 113. The received copy job settings are as illustrated by setting items in FIG. 11.

After receiving the copy job settings and the instruction to start the copy job, the CPU 103 executes scan processing of steps S802 and S803 and print processing of steps S804 and S805 in parallel.

In step S802, the CPU 103 executes scan processing on one page of a document based on the settings received in step S801. Examples of the scan processing include processing of converting color image data of a color-scanned document into monochrome image data, and processing of enhancing an edge in an image. Other examples of the scan processing include processing of correcting a pixel that is not normal due to dust on the scanned document, and processing of removing a background by changing a pixel having a luminance value less than or equal to a predetermined value in the scanned document to a white pixel. The pixel correction processing and the background removal processing are enabled or disabled in advance as the settings of the image processing apparatus.

In step S803, the CPU 103 determines whether all pages of the document have been read. In a case where all of the pages have been read (YES in step S803), the scan processing is ended. Otherwise (NO in step S803), the processing returns to step S802, and the scan processing is executed on the next page.

Meanwhile, in step S804, the CPU 103 executes a one-page print processing based on the settings received in step S801. Details of the one-page print processing will be described below with reference to FIG. 10.

In step S805, the CPU 103 determines whether all pages have been printed. In a case where all of the pages of the document have been printed (YES in step S805), the print processing is ended. Otherwise (NO in step S805), the processing returns to step S804, and the print processing is executed on the next page.

In a case where the scan processing of steps S802 and S803 and the print processing of steps S804 and S805 are both ended, the CPU 103 ends a series of processes of the copy job.

As described above with reference to FIG. 8, for example, a copy job includes a combination of the scan processing and the print processing.

When two types of image processing overlap, the amount of data processed by the image bus 110 increases and may exceed the limit of the data bus.

Thus, in the present exemplary embodiment, the transfer enable clock 404 (transfer clock) is switched to execute the scan processing in parallel with another type of image processing in the units of the image processing. This switches the transfer rate of the image data transfer. In a case where the scan processing is executed in parallel with the other type of image processing, the transfer enable clock 404 is set to a low rate to reduce the amount of data transferred on the image bus 110 per unit time.

The transfer enable clock 404, in a case where the scan processing is singly operated, will be in a single image transfer mode. On the other hand, the transfer enable clock 404, in a case where the scan processing is executed in parallel with the other type of image processing, will be in a parallel image transfer mode. The image data transfer rate in the parallel image transfer mode is lower than the image data transfer rate in the single image transfer mode.

Examples of the other type of image processing include processing of ripping page description language (PDL) data received from an external personal computer (external PC), processing of converting image data stored in the storage memory 105 into Joint Photographic Experts Group (JPEG) data or Portable Document Format (PDF) data before transmission, and processing of converting image data into an image format for fax transmission.

Next, details of the procedure for executing the scan processing on one page of a document in the copy job illustrated in the flowchart in FIG. 8 will be described with reference to a flowchart in FIG. 9. The CPU 103 reads a program stored in the ROM 102 or the storage memory 105 and executes the read program to thereby implement the steps in the flowchart illustrated in FIG. 9.

Figure 8:
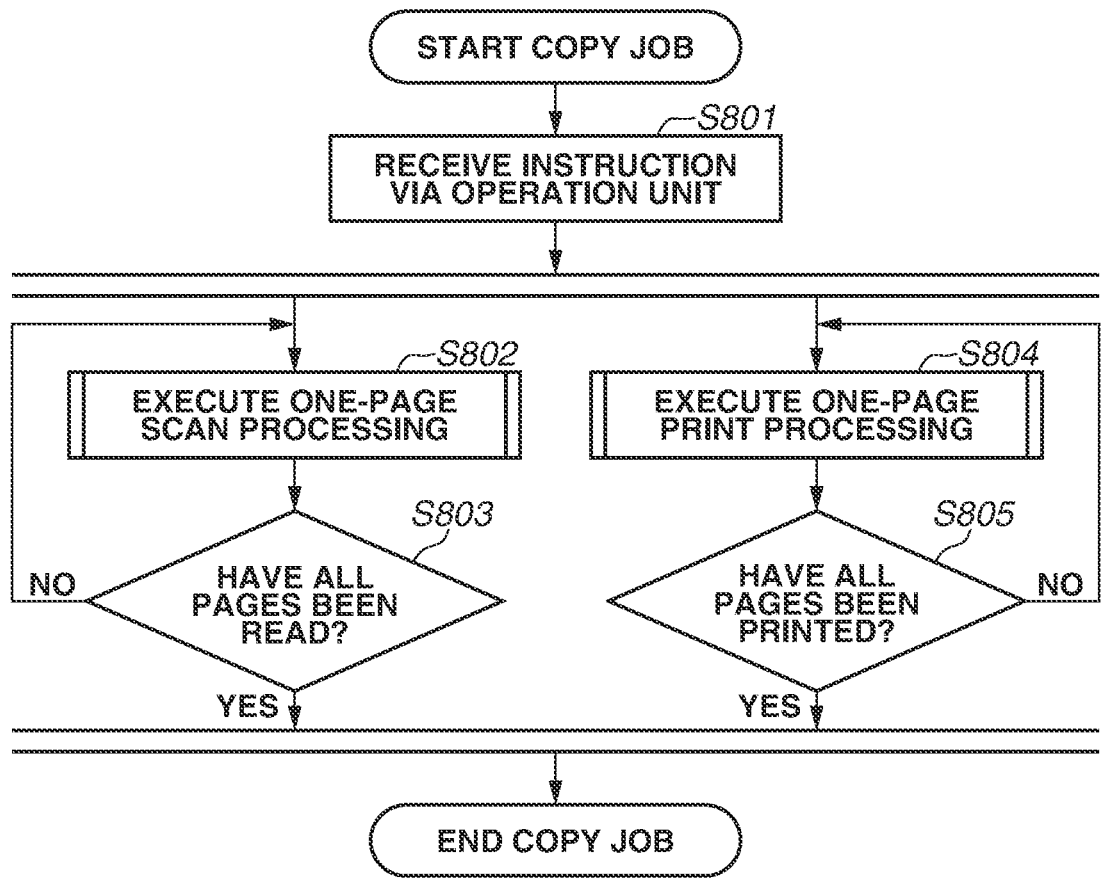
FIG. 8 is a flowchart illustrating a copy operation of an image processing apparatus according to an exemplary embodiment.

First, in step S901, the CPU 103 acquires the copy job settings received via the operation unit 114 in step S801 in FIG. 8. The copy job settings include a document reading setting, a print setting, a post-process setting, and a sheet discharge setting.

In step S902, the CPU 103 determines an ASIC for use in executing the scan processing based on the copy job settings and sets the ASIC.

In step S903, the CPU 103 determines whether image processing other than the scan processing is in execution or on standby. Examples of the image processing other than the scan processing include processing of ripping PDL data received from an external PC, processing of converting image data stored in the storage memory 105 into JPEG data or PDF data before transmission, and processing of converting image data into an image format for fax transmission. In a case where the image processing other than the scan processing is in execution or on standby (YES in step S903), the processing proceeds to step S904. Otherwise (NO in step S903), the processing proceeds to step S909.

In step S904, the CPU 103 notifies the scanner unit 112 that the scanner unit 112 is to operate in the parallel image transfer mode.

In step S905, the CPU 103 instructs the scanner unit 112 to start transferring image data. The scanner unit 112 having received a transfer start instruction starts transferring of the image data.

In step S906, the CPU 103 receives the image data transferred from the scanner unit 112.

In step S907, the CPU 103 executes the scan processing on the image data received in step S906.

In step S908, the CPU 103 stores the image data having undergone the scan process in step S907 in the storage memory 105, and a series of the processes is ended.

In step S909, the CPU 103 determines whether the copy job settings acquired in step S901 satisfy FCOT mode operation conditions.

In a case where the copy job settings acquired in step S901 satisfy the FCOT mode operation conditions (YES in step S909), the image processing apparatus operates in a mode of starting printing of one page without waiting for reading of a one-page document to be completed in order to reduce the time needed to end outputting of the one page. On the other hand, in a case where the copy job settings acquired in step S901 do not satisfy the FCOT mode operation conditions (NO in step S909), the image processing apparatus starts printing of the one page after reading of the one-page document is completed. Details of the FCOT mode operation conditions will be described below with reference to FIG. 11.

In step S909, in a case where the CPU 103 determines that the mode is a copy FCOT mode (YES in step S909), the processing proceeds to step S904, and the CPU 103 notifies the scanner unit 112 of the parallel image transfer mode. Otherwise (NO in step S909), the processing proceeds to step S910, and the CPU 103 notifies the scanner unit 112 of the single image transfer mode.

For example, the single image transfer mode is a clock rate at which image data of 270 pages can be transferred per minute, and the parallel image transfer mode is a clock rate at which image data of 240 pages can be transferred per minute.

Specifically, in a case where it is determined that the FCOT mode operation conditions are satisfied in a situation where there is no other image processing, the transfer rate of image data transfer from the scanner unit 112 to the control unit 115 is set lower than the transfer rate of image data transfer in a case where it is determined that the FCOT mode operation conditions are not satisfied in the situation where there is no other image processing. The clock rates described above are merely examples, and the clock rates are not limited to those described above and can be any clock rates that satisfy the above-described relationship.

While the case where the transfer enable clock 404 is switched between the two modes that are the single image transfer mode and the parallel image transfer mode is described with reference to the flowchart in FIG. 9, this is merely an example, and the number of modes between which the transfer enable clock 404 is switched can be three or more.

Next, details of the procedure for the one-page print processing in the copy job illustrated in the flowchart in FIG. 8 will be described with reference to a flowchart in FIG. 10. The CPU 103 reads a program stored in the ROM 102 or the storage memory 105 and executes the read program to thereby implement the steps in the flowchart illustrated in FIG. 10.

First, in step S1001, the CPU 103 acquires print settings from the copy job settings received via the operation unit 114 in step S801 in FIG. 8.

In step S1002, the CPU 103 determines an ASIC for use in executing the print processing based on the print settings acquired in step S1001 and sets the ASIC.

In step S1003, the CPU 103 determines whether one page has been scanned. In a case where the one page has been scanned (YES in step S1003), the processing proceeds to step S1004. Otherwise (NO in step S1003), the processing proceeds to step S1008.

In step S1004, the CPU 103 determines whether a page other than the one page is being scanned. In a case where the scan processing on the page other than the one page is in execution (YES in step S1004), the processing proceeds to step S1007. Otherwise (NO in step S1004), the processing proceeds to step S1005.

In step S1005, the CPU 103 executes the print processing on the image data stored in the storage memory 105.

In step S1006, the CPU 103 outputs the image data to the printer unit 113, and a series of the one-page print processes is ended.

In step S1007, the CPU 103 determines whether the scan processing being executed is operated in the parallel image transfer mode. In a case where the scan processing is operated in the parallel image transfer mode (YES in step S1007), the processing proceeds to step S1005. Otherwise (NO in step S1007), the processing returns to step S1004.

In step S1008, the CPU 103 determines whether the operation mode of the job is the copy FCOT mode. In a case where the operation mode is the copy FCOT mode (YES in step S1008), the processing proceeds to step S1009. Otherwise (NO in step S1008), the processing returns to step S1003. Details of the copy FCOT mode operation conditions will be described below with reference to FIG. 11, as described above in the description of FIG. 9.

In step S1009, the CPU 103 determines whether the number of lines of written data of the one page in the scan processing (the number of transferred lines) has exceeded a predetermined number of lines Lth. In a case where the number of lines has exceeded the predetermined number of lines Lth (YES in step S1009), the processing proceeds to step S1005. Otherwise (NO in step S1009), the processing remains in step S1009 and waits until the number of lines of written data of the one page in the scan processing exceeds the predetermined number of lines Lth.

The predetermined number of lines Lth is the number of lines that guarantees that the reading side does not overtake the writing side. If the reading of data in the print processing is started at a timing at which the number of lines of written data in the data being subject to the scan processing exceeds the predetermined number of lines Lth, at least the following relationship is established.

$$\frac{\text{Number of Lines} - Lth}{\text{Rate of Writing Data in Scan Processing[line/sec]}} < \quad \text{[Formula 1]}$$

-continued

Number of Lines

Rate of Reading Data in Print Processing[line/sec]

The predetermined number of lines Lth described herein is merely an example and can be any value that is determined so that the print processing does not overtake the scan processing based on a combination of a scanner rate and a printer rate.

Figure 9:
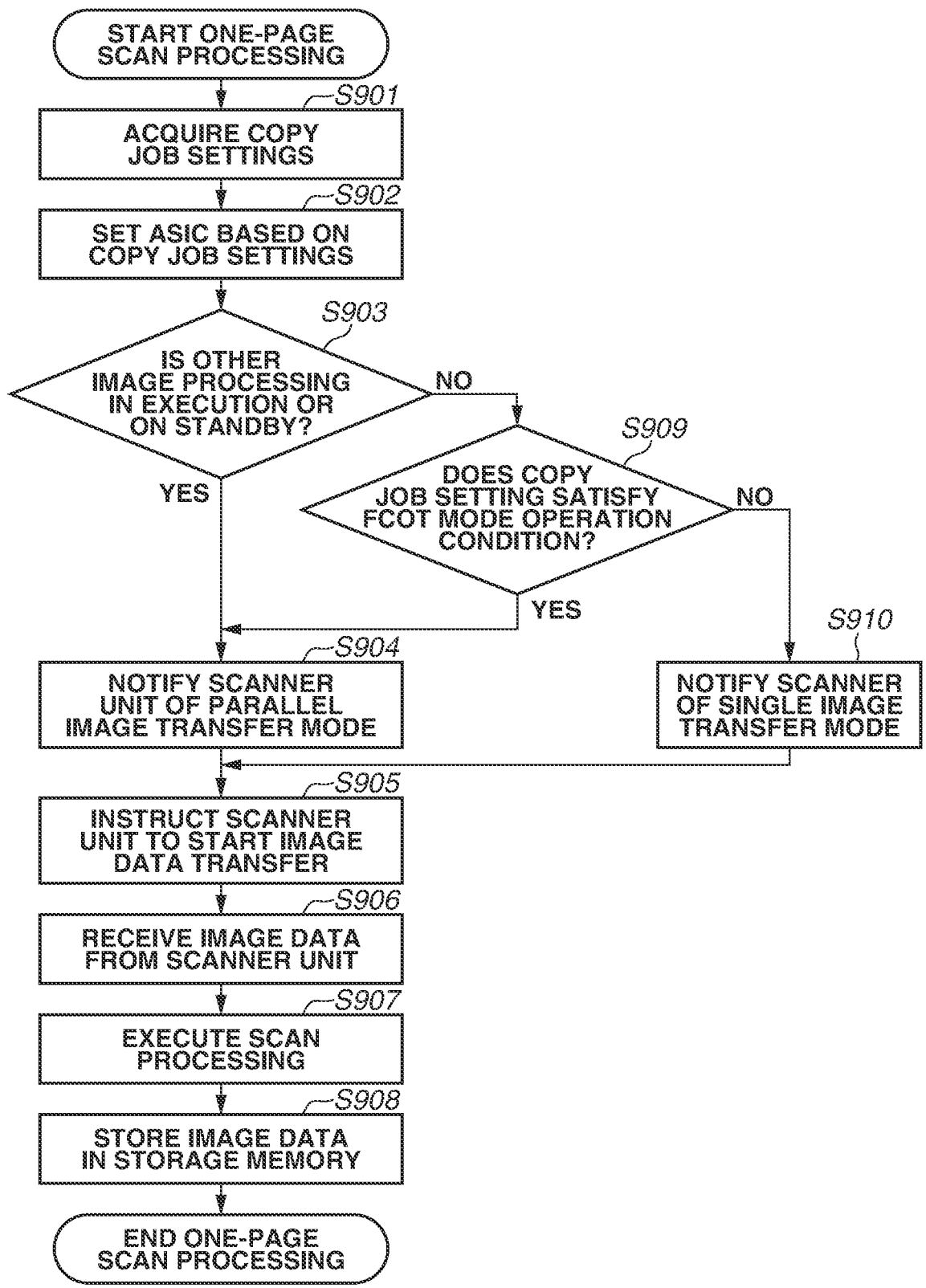
FIG. 9 is a flowchart illustrating a one-page scan processing of an image processing apparatus according to an exemplary embodiment.
Figure 10:
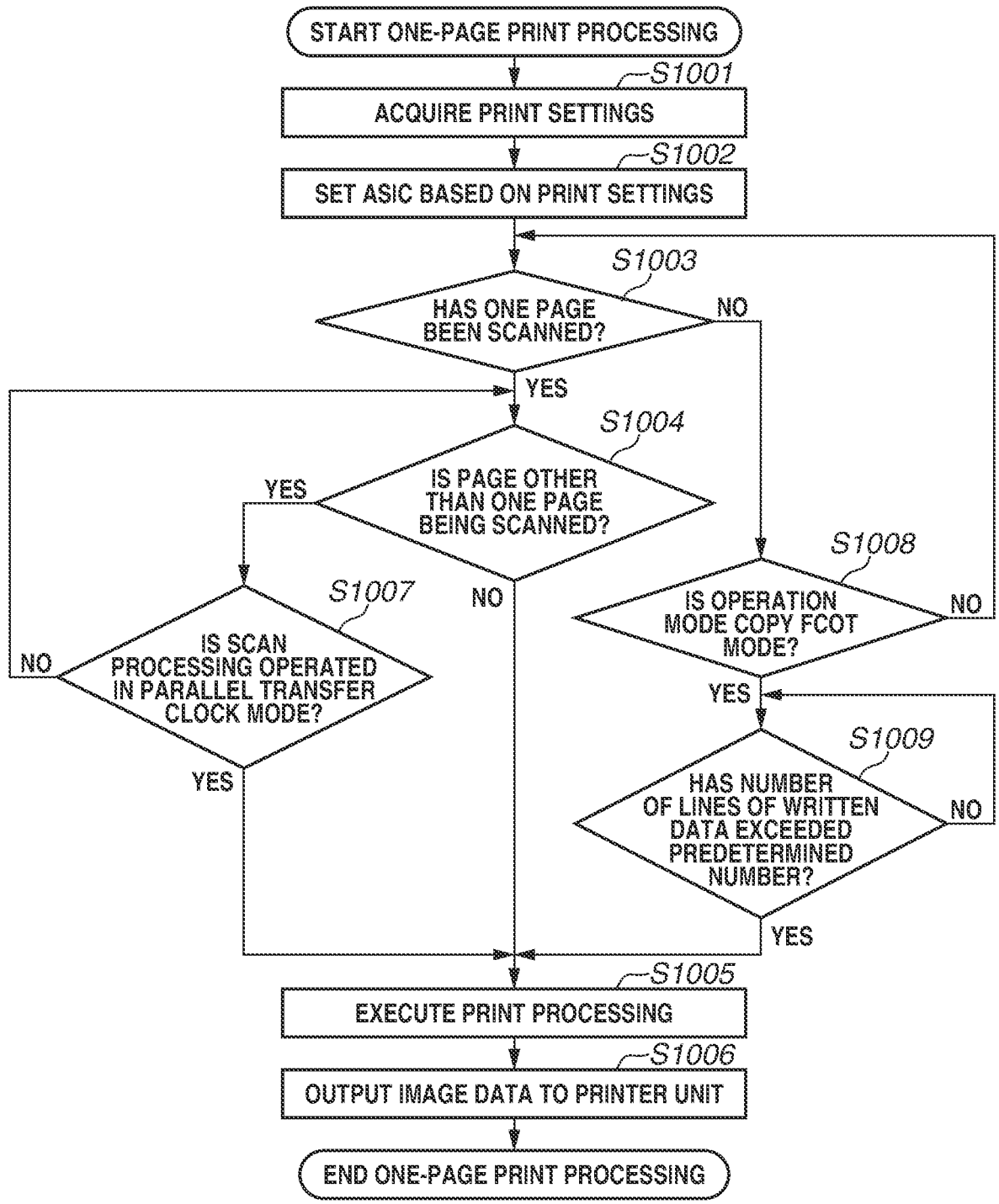
FIG. 10 is a flowchart illustrating a one-page print processing of an image processing apparatus according to an exemplary embodiment.

FIG. 11 is a list of conditions for the FCOT mode determination in step S909 in FIG. 9 and in step S1008 in FIG. 10.

An example of the FCOT mode conditions is that a document reading color mode is not set to auto", i.e., the document reading color mode is set to monochrome or full-color.

Another example of the FCOT mode conditions is that one of a plurality of sheet feeding cassettes that feeds a print sheet to be used in printing is designated.

Another example of the FCOT mode conditions is that a detection result of the document size detection sensor 0203 of the DF unit in FIG. 2 is A4-size or letter size (LTR size).

Another example of the FCOT mode conditions is that a continuous reading mode is set to off. In the continuous reading mode, a plurality of instructions to read a plurality of document sets is provided by the operation unit 114, and printing is started only after a print instruction is received from the operation unit 114.

Another example of the FCOT mode conditions is that a "one-sided reading→one-sided printing" setting in which one side of a document is read and the read image is printed on one side of a print sheet is set.

Another example of the FCOT mode conditions is that a scaling ratio of a scaling function of scaling an image of a read document and printing the scaled image is set to direct (100%).

Another example of the FCOT mode conditions is that an N-on-1 printing function of printing a plurality of pages of a document on one print sheet is set to off.

Another example of the FCOT mode conditions is that an erase-frame function is set to off. The erase-frame function erases part of an image corresponding to borders of several millimeters around the image of a read document.

Another example of the FCOT mode conditions is that a document type is set to text, image, or map.

Another example of the FCOT mode conditions is that a document size mixed function of placing documents of a plurality of sizes on the DF unit and reading the placed documents is set to off.

Another example of the FCOT mode conditions is that an auto-rotation function of automatically rotating an image of a read document based on an orientation of a print sheet is set to off.

Another example of the FCOT mode conditions is that a sorting function of shifting sets of sheets on which images of a document are printed and discharging the shifted sets of sheets is set to off.

Another example of the FCOT mode conditions is that a continuous-copy-of-pages function of printing right and left pages of a double-page spread document such as a book on different print sheets is set to off.

Another example of the FCOT mode conditions is that the number of copies is set to 1.

The image processing apparatus according to the present exemplary embodiment operates in the FCOT mode in a case where all the setting conditions illustrated in FIG. 11 are satisfied. On the other hand, in a case where at least one of the setting conditions is not satisfied, the print processing of a certain page is started after the scan processing on the certain page is completed. The conditions illustrated in FIG. 11 are merely examples of the FCOT mode conditions and are not intended to limit the FCOT mode conditions. The FCOT mode conditions can be fewer than the conditions illustrated in FIG. 11, or a condition other than the conditions illustrated in FIG. 11 can be predetermined.

FIG. 12A is a timing chart illustrating transition of the amount of data processed by the image bus 110 in a case where the image processing apparatus according to the present exemplary embodiment executes a copy job in the FCOT mode. As illustrated in FIG. 12A, the image processing apparatus according to the present exemplary embodiment scans the first page in the parallel image transfer mode to control the data amount not to exceed a band threshold value Dmax of the image bus 110 even in a case where printing of the first page is started while the first page is being scanned.

Meanwhile, FIG. 12B is a timing chart illustrating a case where an operation of scanning the first page is executed not in the parallel image transfer mode but in the single image transfer mode. Specifically, the timing chart can be considered as a timing chart illustrating a case where the operation is executed in the single image transfer mode regardless of the FCOT mode determination result in step S909 in FIG. 9. In this case, the time needed to scan the first page is shorter than that in the case illustrated in FIG. 12A. However, if printing of the first page is started while the first page is being scanned, the total amount of data transfer per unit time exceeds the band threshold value Dmax of the image bus 100. Thus, the operation is controlled to start printing the first page after the first page has been scanned. Specifically, the image processing apparatus according to the present exemplary embodiment reduces the FCOT time by a time difference ΔT (=Tb−Ta) illustrated in FIGS. 12A and 12B.

As described above, the transfer enable clock 404 for transferring an image from the scanner unit 112 to the control unit 115 is switched based on whether the scan processing is operated singly or in parallel with another type of image processing. Then, even in a case where the scan processing is to be operated singly, if the scan processing is a scan for a copy job and the FCOT mode operation conditions are satisfied, the transfer enable clock 404 in the parallel operation is set. This prevents the reading speed of the scanner unit 112 of the apparatus from decreasing so that productivity of the copy job operated in the FCOT mode is prevented from decreasing while the scan is executed in parallel with another type of image processing.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s)

and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-098731, filed Jun. 5, 2020, which is hereby incorporated by reference herein in its entirety.

What is claimed is:

1. An image processing apparatus comprising:
a scanner that scans a document to generate image data;
an image processor that performs image processing;
a printer; and
a controller that causes the image processing apparatus to
determine whether the image processing on the image data is to be executed in parallel with other image processing different from the image processing;
judge whether the printer starts printing an image of the document after reading of an image of a first page of the document is completed or the printer starts printing the image of the document without waiting for the reading of the image of the first page of the document to be completed;
set, based on judgment that the printer starts printing an image of the document after reading of an image of a first page of the document is completed, a frequency of a transfer clock for transferring the image data from the scanner to the image processor to a predetermined frequency in a case where it is determined that the image processing on the image data is not to be executed in parallel with the other image processing different from the image processing; and
set, based on judgment that the printer starts printing the image of the document without waiting for the reading of the image of the first page of the document to be completed, the frequency of the transfer clock to another frequency lower than the predetermined frequency, in a case where it is determined that the image processing on the image data is not to be executed in parallel with the other image processing different from the image processing.

2. The image processing apparatus according to claim 1, wherein, in a case where it is determined that the image processing on the image data is to be executed in parallel with the other image processing different from the image processing, the frequency is set to the another frequency lower than the predetermined frequency.

3. The image processing apparatus according to claim 1, wherein, in a case where it is judged that the printer starts printing the image of the document without waiting for the reading of the image of the first page of the document to be completed, the printer starts printing the image of the document based on storage of a predetermined number of lines of the image data generated by the scanner in a memory.

4. The image processing apparatus according to claim 1, wherein whether the printing of the image of the document is to be started after the reading of the image of the first page of the document is completed or the printing of the image of the document is to be started without waiting for the reading of the image of the first page of the document to be completed is judged based on a predetermined condition.

5. The image processing apparatus according to claim 4, wherein the predetermined condition includes a condition about a size of the document.

6. The image processing apparatus according to claim 4, wherein the predetermined condition includes a condition about a scaling rate of the image data.

7. A method of controlling an image processing apparatus that comprises
a scanner that reads a document to generate image data,
an image processor that performs image processing, and
a printer, the method comprising:
determining whether the image processing on the image data is to be executed in parallel with other image processing different from the image processing;
judging whether the printer starts printing an image of the document after reading of an image of a first page of the document is completed or the printer starts printing the image of the document without waiting for the reading of the image of the first page of the document to be completed;
setting, based on judgment that the printer starts printing an image of the document after reading of an image of a first page of the document is completed, a frequency of a transfer clock for transferring the image data from the scanner to the image processor to a predetermined frequency, in a case where it is determined that the image processing on the image data is not to be executed in parallel with the other image processing different from the image processing; and
setting, based on judgment that the printer starts printing the image of the document without waiting for the reading of the image of the first page of the document to be completed, the frequency of the transfer clock to another frequency lower than the predetermined frequency, in a case where it is determined that the image processing on the image data is not to be executed in parallel with the other image processing different from the image processing.

8. A non-transitory computer-readable storage medium that stores a program for causing a computer to execute a method of controlling an image processing apparatus that comprises
a scanner that reads a document to generate image data,
an image processing unit configured to perform image processing, and
a printer, the method comprising:
determining whether the image processing on the image data is to be executed in parallel with other image processing different from the image processing;
judging whether the printer starts printing an image of the document after reading of an image of a first page of the document is completed or the printer starts printing the image of the document without waiting for the reading of the image of the first page of the document to be completed;

setting, based on judgment that the printer starts printing an image of the document after reading of an image of a first page of the document is completed, a frequency of a transfer clock for transferring the image data from the scanner to the image processor to a predetermined frequency, in a case where it is determined that the image processing on the image data is not to be executed in parallel with the other image processing different from the image processing; and setting, based on judgment that the printer starts printing the image of the document without waiting for the reading of the image of the first page of the document to be completed, the frequency of the transfer clock to another frequency lower than the predetermined frequency, in a case where it is determined that the image processing on the image data is not to be executed in parallel with the other image processing different from the image processing.

* * * * *